(12) United States Patent
Jarosch et al.

(10) Patent No.: US 7,820,445 B2
(45) Date of Patent: Oct. 26, 2010

(54) FLUIDIZATION AND SOLIDS PROCESSING IN MICROCHANNEL DEVICES

(75) Inventors: Kai Jarosch, Bexley, OH (US); Anna Lee Tonkovich, Marysville, OH (US); David J. Hesse, Columbus, OH (US); Eric Daymo, Marysville, OH (US); Steven T. Perry, Galloway, OH (US); Laura J. Silva, Dublin, OH (US)

(73) Assignee: Velocys, Plain City, OH (US)

( * ) Notice: Subject to any disclaimer, the term of this patent is extended or adjusted under 35 U.S.C. 154(b) by 697 days.

(21) Appl. No.: 10/830,710

(22) Filed: Apr. 22, 2004

(65) Prior Publication Data
US 2005/0239910 A1    Oct. 27, 2005

(51) Int. Cl.
*G01N 31/10* (2006.01)
(52) U.S. Cl. .......................... 436/37; 422/145
(58) Field of Classification Search ................. 422/145, 422/139, 141, 147, 151, 152; 436/37
See application file for complete search history.

(56) References Cited

U.S. PATENT DOCUMENTS

| | | | | |
|---|---|---|---|---|
| 4,533,254 | A | 8/1985 | Cook et al. | 366/176 |
| 5,342,609 | A | 8/1994 | Meeh et al. | 424/9 |
| 5,543,016 | A | 8/1996 | Fehlner et al. | 204/157.6 |
| 6,541,213 | B1 | 4/2003 | Weigl et al. | 435/7.1 |
| 6,555,139 | B2 | 4/2003 | Sharma | 424/489 |
| 2002/0182735 | A1 | 12/2002 | Kibby et al. | 436/37 |
| 2003/0083410 | A1 | 5/2003 | Baur et al. | 524/190 |
| 2004/0005723 | A1* | 1/2004 | Empedocles et al. | 438/1 |
| 2004/0076562 | A1* | 4/2004 | Manzanec et al. | 422/211 |

FOREIGN PATENT DOCUMENTS

| | | |
|---|---|---|
| WO | WO 03/099429 A1 | 12/2003 |
| WO | WO 2004/103549 A2 | 12/2004 |

OTHER PUBLICATIONS

Willie et al., "Progress in Transferring Microreactors from Lab into Production—an Example in the Field of Pigments Technology," IMRET 6, Nov. 30, 2001.
Kaer, "Modeling Deposit Formation in Straw-Fired Grate Boilers," 2001.
Nelson, "Dispersing Powders in Liquids—4: Particle Structure," Educ. Reso. For Part. Techn., 2001.
"Troublefree Pneumatic Conveying," Chem. Eng., Apr. 1998.
Rush, "Dispersion by Pressure-Driven Flow in Serpentine Microfluidic Channels," Ind. Eng. Chem. Res., pp. 4652-4662 (Jul. 2002).
Foust et al., Principles of Unit Operations, 2nd ed., p. 257.
Harrison et al., An automatic precision microreactor p. 18-24.

\* cited by examiner

*Primary Examiner*—Natalia Levkovich
(74) *Attorney, Agent, or Firm*—Frank Rosenberg

(57) ABSTRACT

This invention describes gas-solid, liquid-solid and gas-solid-liquid processes in microchannels devices including such processes as heterogeneous catalysis, particle formation, particle attrition, particle separation and adsorption or desorption of selected species. Various processes can be enhanced by the unique properties of microchannels such as the predominance of laminar flow, high rates of shear, high rates of heat transfer and high rates of mass transfer. Also encompassed by this invention are methods for the introduction to and removal from microchannels of particle containing fluid streams.

67 Claims, 9 Drawing Sheets

FLUIDIZATION AND SOLIDS PROCESSING IN MICROCHANNEL DEVICES

Fluidization is the process by which a fluid is passed through a bed of solids at a velocity that suspends the solids in the flowing stream. Types of fluidization have been categorized by authors such as Grace, J. R., "Contacting Modes and Behaviour Classification of Gas-Solid and other Two-Phase Suspensions", *Can. J. Chem. Eng.*, v 64, pp353-363, 1986. In industry, fluidization has been applied to a number of chemical engineering unit operations including chemical reaction (for example, gas oil cracking, phthalic anhydride production, acrylonitrile production, and combustion reactions), material separation and classification, drying, calcining, and ore roasting amongst others.

An advantage of fluidizing catalyst particles is the very short mass transfer distances, from both the bulk of the gas to the catalyst surface and from the surface of the catalyst to internal sites, involved. An alternative method to achieve short mass transfer distances is to conduct catalyzed reactions in a microchannel reactor. However, the conventional wisdom has been that microchannel reactors should not be used with fluidized particulates since the particulates would clog the microchannels. See, for example, Wegeng et al., U.S. Pat. No. 5,811,062.

On the other hand, microchannel reactors have been successfully used for liquid phase reactions that produce very small, highly uniform particles. See Meeh et al., U.S. Pat. No. 5,342,609 and Nickel et al, U.S. Pat. No. 6,566,519. A subsequent paper by a group of authors including Nickel reported that the liquid-phase synthesis of pigment particles in a microchannel reactor resulted in reactor pigments with $D_{50}$ values smaller than 250 nm with a standard deviation for the particle size distribution of s=1.5. Willie et al., "Progress in Transferring Microreactors from Lab into Production—an Example in the Field of Pigments Technology," IMRET Int'l Conf. on Microreaction Technology," Nov. 30, 2001.

As described below, the present invention describes chemical processes utilizing the fluidization of particulates including gas phase processes and chemical reactions catalyzed by particulate catalysts moving in fluids through microchannels.

SUMMARY OF THE INVENTION

In a first aspect, the invention provides a method of conducting a chemical process, comprising: flowing a gaseous stream carrying solid particulates through a microchannel; controlling the flow such that operating conditions and microchannel dimensions are such that the run up length, $x_H$, is less than the microchannel length; wherein $$x_H = 0.338 \left(\frac{H}{2}\right)^2 \left(\frac{U}{v}\right).$$

These variables are described elsewhere in the specification. In preferred embodiments, the microchannel has a rectangular cross-section. In another preferred embodiment, the solids flux through the microchannel cross section is continuously greater that 0.01 kg/m² s for at least 8 hours. In more preferred embodiments, the run up length is up to 75, 50, 20 or 10% of the microchannel length.

In another aspect, the invention provides a method of conducting a chemical process, comprising: passing a gaseous stream through a microchannel, and controlling the flow of the gaseous stream to obtain a laminar flow regime. The gaseous stream comprises solid particulates. In one preferred embodiment, the particulates are synthesized within the microchannel. In another preferred embodiment, a second gas enters the microchannel; preferably the second gas is a second reactant, a diluent, or a quench gas, thus limiting the reaction to the microchannel. Optionally, the particulates can be recycled or removed.

The invention further provides a method of conducting a chemical process, comprising: flowing a fluid stream into a header and through a flow modifying manifold connection to form a distributed flow. This process occurs in an apparatus in which there is an interface between the header and a microchannel array. The distributed flow (a) carries solid particulates through the microchannel array, or (b) entrains solid particulates. In some preferred embodiments, the distributed flow both entrains particulates and carries the entrained particulates through the microchannel array. In some embodiments, the flow modifying manifold connection tends to distribute flow equally into the microchannel array. In a preferred embodiment, flow is distributed with a Q factor of less than 30%.

In yet another aspect, the invention provides a method of conducting a chemical process, comprising: flowing a first fluid stream carrying solid particulates through a microchannel; wherein at least a portion of the solid particulates are agglomerated; and passing a second fluid stream into the microchannel at a rate sufficient to cause a decrease in particle agglomeration.

In a still further process, the invention provides a method of conducting a chemical process, comprising:

providing a first fluid stream carrying solid particulates into a microchannel in a direction opposing gravity;

wherein the microchannel has an inlet, an outlet and a length between the inlet and the outlet;

wherein the microchannel is further defined by at least one microchannel wall;

wherein said at least one microchannel wall comprises at least one orifice;

wherein said at least one orifice is located between the inlet and the outlet;

wherein the first fluid stream flows into the microchannel at a rate such that at least a portion of said particulates are pulled down by gravity and are not carried along the entire length of the microchannel; and providing a second fluid that passes through the orifice, into the microchannel, and out of the outlet. The invention also provides a chemical system having these components. In some embodiments, this method can be used to separate particles. In some embodiments, the apparatus has an array of microchannels and in some embodiments, the microchannel or array of microchannels are substantially parallel to gravity. In some preferred embodiments, the second fluid comprises a quenching agent.

In a further aspect, the invention provides a method of conducting a chemical reaction in an integrated microchannel device, comprising:

entraining catalyst particles in a fluid to form a fluidized stream;

passing the fluidized stream from an entrainment zone to at least one process microchannel;

passing the fluidized stream around a dividing wall;

wherein, after the fluidized stream passes around the dividing wall, particles in the fluidized stream pass back down at least one return microchannel;

wherein the dividing wall separates the at least one process microchannel and the at least one return microchannel; and wherein, after the fluidized stream passes around the dividing wall fluid from the fluidized stream exits through an outlet; and wherein the stream exiting through the outlet has a lower volume fraction of particulates than the fluidized stream. In a preferred embodiment, the second fluid flows into microchannel to sweep particles down the return side. Preferably, the at least one process microchannel and the at least one return microchannel are disposed on a common plane. This method can be used for chemical reactions, for example, methanol synthesis.

In yet another aspect, the invention provides a method of conducting a catalyzed chemical reaction in a microchannel reactor, comprising: providing a first fluid stream carrying solid catalyst particulates into a microchannel; and using the solid catalyst particulates to catalyze a reaction in the microchannel. In this method, the solid catalyst particulates move out of the microchannel, and are subsequently recycled back into the microchannel in a continuous fashion.

In a further aspect, the invention provides a method of entraining particulates in a gas stream, comprising: flowing a liquid/particle slurry into a wick inside a microchannel to form a slurry in a wick in a microchannel; exposing the slurry in a wick in a microchannel to pressure and temperature conditions such that the liquid evaporates; and forming a solids-in-gas suspension comprising particles from the slurry. Preferably, this method further comprises a step of passing a gas into the microchannel to assist in entraining the particles in a gas.

The invention also provides a method of removing particulates from a suspension, comprising: flowing a liquid in a wick in a microchannel; flowing a solids-in-gas suspension into the microchannel comprising the liquid in the wick; wherein solid particulates in the solids-in-gas suspension are transferred into the liquid in the wick. The liquid suspension thus formed can flow out of the microchannel and may be easily separated from the gas.

While several of the above-described inventive aspects have been described in terms of methods, it should be appreciated that the invention includes any of the apparatus or chemical systems (apparatus in combination with fluids and/or process conditions) that are described herein. For example, the invention also provides a chemical system comprising an apparatus comprising a wick in a microchannel wherein there is a slurry in the wick and a solids-in-gas suspension in the microchannel.

In some inventive aspects, solid particulates can be carried along at substantially the same speed as the fluid—this happens with suspensions of very small particles that are held in solution by sol-type intermolecular interactions. In some preferred embodiments, the particulates move at a rate that is significantly slower (i.e., at least 10% longer mean residence times) than the carrier fluid—this happens where the velocity of the particles is decreased by a force other than the fluid drag on the particles including, but not limited to, gravity, a magnetic field, or electrostatic interactions with the walls. For example for particles which are large enough so that a gravitational body force acting on the particles has a non-trivial component in a direction opposite to the direction of fluid flow, the particles are slowed down relative to the bulk fluid flow. Flow of the carrier fluid can be laminar, transition, or turbulent. In some preferred embodiments, the fluid is a gas. In some preferred embodiments, the contact time of gas through the microchannels is less than 500 ms, in some embodiments less than 100 ms, in some embodiments less than 50 ms, and in some embodiments, 1 to 500 ms. For a system with a liquid carrier fluid as opposed to a gaseous carrier fluid, the expected range of reaction contact times may be up to three orders of magnitude higher than the preferred ranges for gaseous reactions. In some embodiments of the invention, the particulates are acted upon by a force other than fluid drag inside the microchannel(s) and thus may have an average residence time that is at least 10% longer, in some embodiments at least 30% longer than the carrier fluid. The average residence time of solids can be measured (preferably) by introducing tracer particles and measuring the time needed for them to emerge or (if tracer particles are impracticable) by introducing solids and using optical or fiber optical probes to assess the solids content of the gas exiting the microchannels.

In some embodiments, the median particle size is at least 0.1 micron ($\mu m$), in some embodiments at least 5 $\mu m$, in some embodiments at least 20 $\mu m$, in some embodiments no larger than 50 $\mu m$, in some embodiments no larger than 100 $\mu m$, in some embodiments no larger than 500 $\mu m$, and in some embodiments within the ranges set by these preferred sizes. In some embodiments, smaller mean particle diameters may also be used in the inventive process, including mean particle diameters in the range of 5 to 100 nanometers. In some embodiments the volume fraction solids in a fluid stream is at least 0.01, in some embodiments at least 0.05, in some embodiments at least 0.10, in some embodiments no more than 0.20, in some embodiments no more than 0.40, in some embodiments no more than 0.70, and in some embodiments within the ranges set by these preferred volume fractions. In some embodiments the solids flux through a microchannel, array of microchannels, or device is at least 0.1 $kg/m^2 \cdot s$, in some embodiments at least 1.0 $kg/m^2 \cdot s$, in some embodiments at least 10 $kg/m^2 \cdot s$, in some embodiments at least 50 $kg/m^2 \cdot s$, in some embodiments at least 100 $kg/m^2 \cdot s$ and in some embodiments in the range of 10 to 500 $kg/m^2 \cdot s$.

Catalyst particles can include metal particles such as Ni, Fe, and Co; or metals dispersed on a metal oxide such as transition metals on a metal oxide, in some preferred embodiments precious metals such as Pt, Rh, Ir, Pd, Os, Re, and Ru on a metal oxide. In some embodiments, at least 50 volume %, and in some systems at least 90 volume % of the solids present in the system are catalyst particles.

Back-mixing in transported beds can have a significant negative impact on product yield in processes such as the conversion of gas oil to gasoline, including a reduction in selectivity to the desired product by flowing the desired product back through reaction conditions and thus allowing secondary reactions. In some embodiments of this invention, high shear rates and laminar flow regime present in a microchannel substantially reduce the presence of back-mixing.

Various embodiments of the present invention offer further advantages in process efficiency and intensification. In preferred embodiments, the process microchannels are straight-through channels that lack any curves or serpentine configurations. In some preferred embodiments, pressure drop through the microchannel, microchannel array, or entire device, is less than 10 bar, in other embodiments is less than 1 bar, in other embodiments is less than 0.5 bar, more preferably less than 0.25 bar, and in some embodiments is in the range of 0.035 to 0.34 bar. In some preferred embodiments, contact time of the fluid and/or the entrained mixture through the microchannel, microchannel array, or entire device, is less than 1000 ms, in some embodiments is less than 500 ms and in other embodiments is less than 250 ms more preferably less than 50 ms, and in some embodiments is in the range of 10 ms to 100 ms. In some preferred embodiments for solids entrained in a liquid reactant, the contact time may be less than 1000 seconds, in other embodiments less than 500 seconds, and in other embodiments less than 50 seconds. In preferred embodiments, an inventive process can be operated continuously for at least 8 hours without clogging and at substantially undiminished productivity.

One advantage to the use of microchannels for carrying out particulate fluidization is the ability to tightly control the manner in which various fluids are allowed to interact with the particles. Specifically, the local fluid composition and the time over which fluid(s) and particles are allowed to remain in contact can be tightly controlled, a distinct advantage over conventional fluidized beds. Additional fluid(s) can be separately distributed to each microchannel and mixed with an already fluidized bed flowing within the microchannel at temperature and pressure conditions necessary to carry out the desired chemical process. Because of the small hydraulic diameter of the microchannels, mixing is quick and temperature and residence time are more easily controlled. For example, in one embodiment, one or more additional reactants may be added to a fluidized bed within a microchannel or set of microchannels, each comprising at least one other reactant and an entrained, fluidized particulate catalyst. In this way, fast, uniform mixing of the reactants can be carried out in close proximity to the fluidized catalyst particles, allowing tight control over reaction times for heterogeneous catalyzed reactions. In another embodiment, a second fluid is distributed and introduced into each microchannel in order to quench a chemical reaction occurring in the microchannels comprising a fluidized particulate stream. In yet another embodiment, one reactant in a chemical reaction is distributed along the length over which the fluid in the fluidized channel flows in order to control the rate of reaction. In yet another embodiment, a liquid product is removed via wick as it is formed in the microchannel containing the fluidized particles, allowing the local equilibrium of the process to shift as the chemical process is carried out.

For any of the apparatus and methods, the heights of connecting channels and/or manifolds are preferably in the range of 20 µm to 50 mm, more preferably 20 mm or less, and even more preferably less than 10 mm. The thickness of walls separating channels or manifold walls are preferably in the range of 20 µm to 5 mm, more preferably 2 mm or less. Connecting channels preferably have a length of 1 cm to 10 m In a stacked device, the web thickness between layers is preferably the thickness of a sheet (in other words, in some preferred embodiments, devices are made by cutting features through a sheet rather than etching). Any of the articles described herein may have multiple layers and repeating sets of layers (repeating units). For example, 2, 10, 50 or more repeating units within a laminate. This multiplicity, or "numbering up" of layers creates added capacity of microchannel laminated devices. Throughout all aspects, the figures are merely illustrative and do not limit all aspects of the invention).

GLOSSARY

As is standard patent terminology, "comprising" means "including" and neither of these terms exclude the presence of additional or plural components. For example, where a device comprises a lamina, a sheet, etc., it should be understood that the inventive device may include multiple laminae, sheets, etc.

A "chemical process" is a process in which materials undergo a chemical or physical change. Examples of chemical processes include chemical reactions, mixing, separations, crystallization, emulsion formation, drying, and phase changes.

"Connecting channels" are channels connected to a manifold. Typically, unit operations occur in connecting channels. Connecting channels have an entrance cross-sectional plane and an exit cross-sectional plane. Although some unit operations or portions of unit operations may occur in a manifold, in preferred embodiments, greater than 70% (in some embodiments at least 95%) of a unit operation occurs in connecting channels. In preferred embodiments, the connecting channel walls are straight.

"Downdraft" is the movement of fluid or of solid particulates or of fluid and solids particles (suspension) in a direction counter to that of the superficial velocity caused by separation of a portion of the flow from the bulk of the flow. Downdraft encompasses the formation of recirculation cells in which fluid and or fluid and solids flow in a 'loop' separate from the bulk of the fluid and or suspension.

A "header" is a manifold arranged to deliver fluid to connecting channels and a "footer" is a manifold arranged to take away fluid from connecting channels.

In the present invention, a microchannel is defined as a channel having at least one dimension of 10 millimeters or less, in some embodiments 2 millimeters or less, and in some embodiments, 0.1 to 1 millimeter. Microchannels are not merely orifices; the length of a microchannel (that is, the direction of flow during normal operation) is not the shortest dimension of a microchannel. Both height and width of a microchannel are substantially perpendicular to the direction of flow of reactants through the reactor. Microchannels are also defined by the presence of at least one inlet that is distinct from at least one outlet—microchannels are not merely channels through zeolites or mesoporous materials. The height and/or width of the reaction microchannel is preferably about 2 mm or less, and more preferably 1 mm or less. Preferably, the length of a microchannel is greater than 1 cm, in some embodiments in the range of about 1 to 50 cm. The sides of the microchannel are defined by a microchannel wall of walls. The choice of material for the walls depends on the intended use. These walls are preferably made of a hard material such as a ceramic, an iron based alloy such as steel, or monel. In some embodiments, the microchannel walls are comprised of a stainless steel or Inconel® which is durable and has good thermal conductivity. The microchannel devices can be made by known methods, and in some preferred embodiments are made by laminating interleaved plates (also known as "shims"), and in some preferred embodiments, shims designed for reaction channels are interleaved with shims designed for heat exchange. In some preferred embodiments, the microchannel devices are microchannel reactors that include a plurality of microchannel reaction channels, preferably in thermal contact with a plurality of adjacent heat exchange microchannels. A plurality of microchannels may contain, for example, 2, 10, 100, 1000 or more channels. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. During operation, the heat exchange microchannels (if present) contain flowing heating and/or cooling fluids. Non-limiting examples of this type of known reactor usable in the present invention include those of the microcomponent sheet architecture variety (for example, a laminate with microchannels) exemplified in U.S. Pat. Nos. 6,200,536 and 6,219,973 (both of which are hereby incorporated by reference). Performance advantages in the use of this type of architecture include their relatively large heat and mass transfer rates, and the substantial absence of any explosive limits. Microchannel reactors can combine the benefits of good heat and mass transfer, excellent control of temperature, residence time and minimization of by-products. Pressure drops can be low, allowing high throughput. Furthermore, use of microchannel reactors can achieve better temperature control, and maintain a relatively more isothermal profile, compared to conventional systems. In addition to the process microchannel(s), additional features such as microchannel or non-microchannel heat exchangers may be present. Microchannel heat exchangers are preferred. Heat exchange fluids may flow through adjacent heat transfer microchannels, and can be gases or liquids and may include steam, liquid metals, or any other known heat exchange fluids—the system can be optimized to have a phase change in the heat exchanger. In some preferred embodiments, multiple heat exchange layers are interleaved with multiple reaction microchannels (for example, at least 10 heat exchangers interleaved with at least 10 process microchannels.

In the present invention, unless specified otherwise, the fluid that fluidizes or carries a particulate may be a gas, vapor, liquid or mixture of any two or all three.

Particulate size—In the present invention, "particulates" (also called "particles") are solids. In the broadest embodiments of the invention, particulates are just smaller than the microchannel through which they pass. Generally, particulates can be of any shape such as granular, dendridic, flake (including plates), rods (including needles), and irregular shape. In some preferred embodiments, the particulates are substantially spherical.

In the present invention, "particle size" is a distribution that is characterized per ASTM D 4464-00 entitled 'Standard Test Method for Particle Size Distribution of Catalytic Material by Laser Light Scattering'. ASTM D 4464-00 has qualified this test for particles in the range 30 to 300 μm but it is capable of measuring particles in the range of 0.02 to 2000 μm. Particle size is quantified by referring to the center value median bin when a particle size distribution is broken down into at least 10 size ranges. This test uses a volume weighted particle diameter. In some preferred embodiments, the particle size distribution has a median value of 200 to 800 μm, and in some embodiments the particle size distribution has a median value of 100 to 300 μm and in some embodiments the particle size distribution has a median value of 75 to 150 μm, and in other embodiments the particle sized distribution has a median value of 25 to 75 μm, and in other embodiments the particle sized distribution has a median value of 10 to 30 μm. In some embodiments there is no particle greater than 1000 μm, and in some embodiments there is no particle greater than 100 μm.

Quality Index factor "$Q_1$" is a measure of how effective a manifold is in distributing flow among more than one microchannel. In the description below, a microchannel is also referred to as a "connecting channel". It is the ratio of the difference between the maximum and minimum rate of connecting channel flow divided by the maximum rate of connecting channel flow. For systems of connecting channels with constant channel dimensions it is often desired to achieve equal mass flow rate per channel. The equation for this case is shown below, and is defined as $Q_1$.

$$Q_1 = \frac{m_{max} - m_{min}}{m_{max}} \times 100\%$$

where
$m_{max}$[kg/sec]=maximum connecting channel mass flow rate
$m_{min}$[kg/sec]=minimum connecting channel mass flow rate For cases when there are varying connecting channel dimensions it is often desired that the residence time, contact time, velocity or mass flux rate have minimal variation from channel to channel such that the required duty of the unit operation is attained. For those cases we define a quality index factor $Q_2$:

$$Q_2 = \frac{G_{max} - G_{min}}{G_{max}} \times 100\%,$$

where G is the mass flux rate. For cases when all the connecting channels have the same cross sectional area, the equation for $Q_2$ simplifies to $Q_1$. The quality index factor gives the range of connecting channel flow rates, with 0% being perfect distribution, 100% showing stagnation (no flow) in at least one channel, and values of over 100% indicating backflow (flow in reverse of the desired flow direction) in at least one channel. $Q_1$ and $Q_2$ are defined based on the channels that comprise 95% of the net flow through the connecting channels, the lowest flow channels are not counted if the flow through those channels is not needed to account for 95% of the net flow through the connecting channels.

BRIEF DESCRIPTION OF THE DRAWINGS

FIG. 4b is a magnified view of a portion of the jet section of the device of FIG. 4a.

DETAILED DESCRIPTION OF THE INVENTION

Solids Transport

Figure 1:
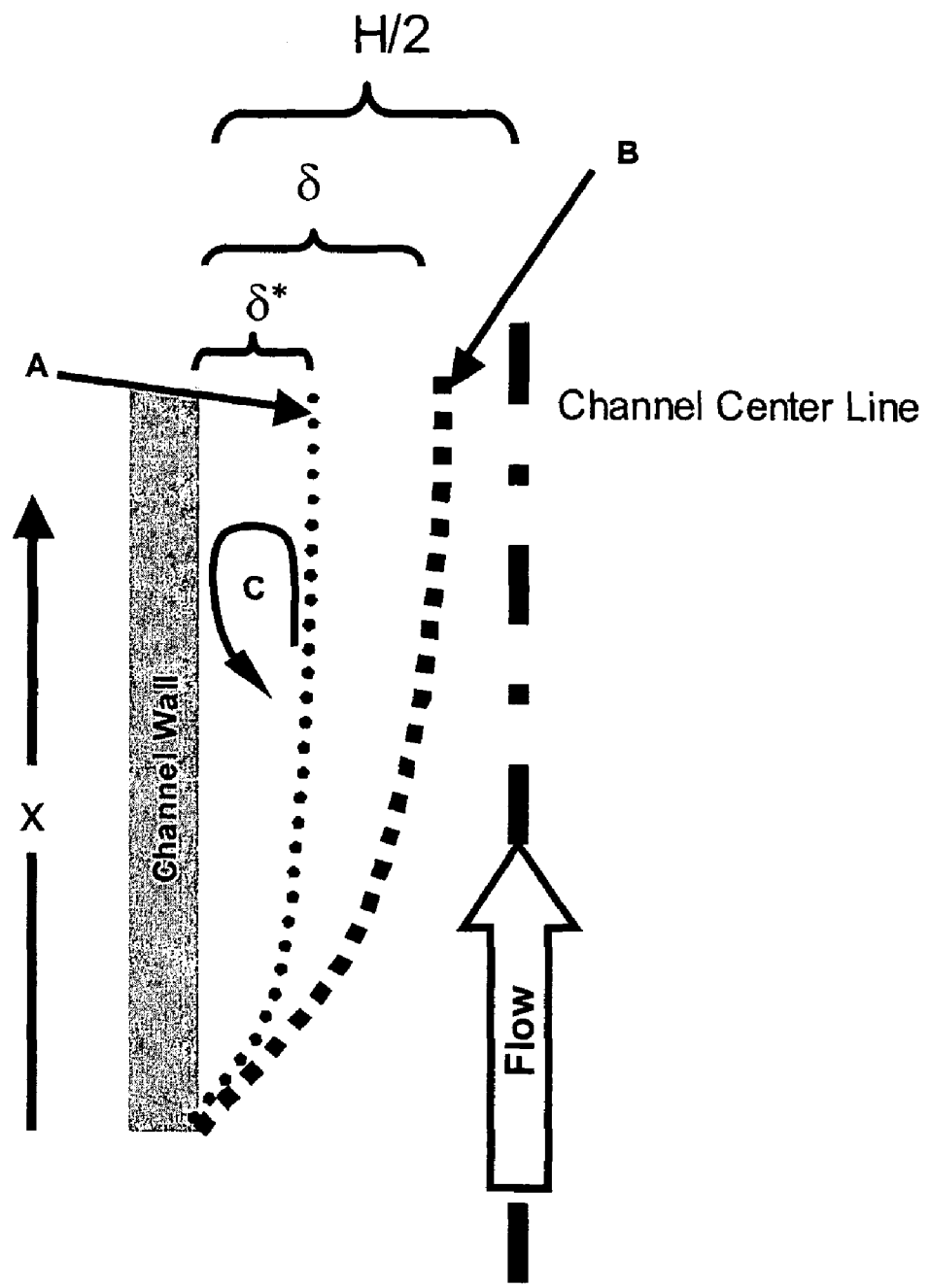
FIG. 1 illustrates the relationship between boundary layer thickness (B) and displacement thickness (A) showing the location of potential downdraft (back mixing) cell formation (C).

Solids bridging is an important cause of channel blockage when transporting slurried or suspended material. The potential for bridging is higher when the particles are adhesive and/or cohesive to each other and to the channel walls.

Industrially, bridging is avoided by increasing the pipe diameter, injecting air to break up agglomerates, or intense agitation in feed tanks (mechanical energy to break up solids). See, for example, http://www.magnumsystems.com/case- Hist/smootCase004.htm. Furthermore, industrial slurry transport systems operate in the turbulent regime so that the velocity is above the minimum required for complete fluidization. Usually such velocities (combined with the larger diameter pipes in conventional systems) result in turbulent flow.

Another important factor is critical velocity—the velocity above which the solids are suspended in a slurry system. Slurry pipelines are normally operated above the critical velocity so that the slurry is homogeneous. There are many theoretical equations and correlations for calculating the critical velocity. One popular theoretical method to calculate the critical velocity is the Ororskar and Turian equation.

Despite the high shear forces in laminar flow, conventional slurry pipelines do not usually operate in laminar flow because the critical velocity is not exceeded. A microchannel system may be designed to prevent agglomeration by having one or more of the following features:

1. Walls with a coating that inhibits the adhesion of particles to the wall. Surface effects (such as surface charges on the particles and on the walls and charges created by flowing past a wall) can play a large role in the agglomeration behavior of particles flowing in a microchannel. Coatings may include Teflon, polymeric, metallic, metal oxide, hydrophobic, hydrophilic, and combinations thereof.

2. Fluid jets that allow fluid flow to break up particle agglomerates. Micro-jets can be designed to deliver a much higher shear force than larger air holes in larger systems. The greater forces imparted by microjets into microchannels can break agglomerated particles into even smaller particles than would otherwise be possible.

Furthermore, it may be desirable to operate the microchannel solids processing system at low flow rate—perhaps even laminar flow rates—and reduce pumping requirements. Because of the small diameters inherent in microchannel systems, it is easier to stay above the critical velocity and maintain homogeneous flow even while in the laminar regime. Furthermore, the higher wall shear forces present with laminar flow may also cause agglomerations to break up more easily than in turbulent flow. Higher shear forces are observed in laminar flow (with parabolic velocity profiles) than in turbulent flow (with nearly flat velocity profiles). This higher shear rate is due to the higher velocity gradient associated with the parabolic laminar velocity profile:

$Fs = \mu dV/dr$, where Fs is the shear force, $\mu$ is the viscosity, and $dV/dr$ is the velocity gradient.

Shear force on a fluid control element (in discretized form) in direction of velocity u is calculated by $Fx = mu*du/dy$, where mu is viscosity, and $du/dy$ is velocity gradient of the fluid flow normal to the flow direction. However, as in a location of fluid (represented by a control element) the velocity generally has 3 components, shear force also has three components. For a channel flow near and at the surface, a one dimensional assumption can be generally made and Fx can approximate the net shear at an element surface of the fluid-wall interface. It is seen that the velocity field u as function of distance to wall y has to be known in the equation. Generally one has to solve momentum and mass conservation equations and eventually also energy equation if temperature field is non-uniform. The use of computational fluid dynamics, including commercial software packages such as Fluent® or FEMLAB®, are used to simultaneously solve all transport equations such that the surface shear force may be calculated. The surface shear force may be further calculated along the channel length, parallel to the direction of flow. Shear force may also be calculated between parallel microchannels, where flow distribution effects are included to determine the mass flux into each parallel channel as a function of the detailed channel and manifold geometry. More stringent expressions and calculation methods can be found in text books, such as "Fundamentals of Fluid Mechanics, $3^{rd}$ Ed." B. R. Munson, D. F. Young and T. H. Okiishi, John Wiley &Son, Inc., Weinheim, 1998".

REFERENCE

A. Shekarriz et. al. 1997. "Cross Site Transfer System at Hanford: Long-Term strategy for Waste Acceptance." PNNL-11497. Pacific Northwest National Laboratory, Richland, Wash.

Fluidized Bed Microchannel Advantage—Design and Operation to Avoid Back-Mixing and Stagnant Zones When the design intent of a fluidized bed system is to actively transport solids, such as is done in fast fluidized systems or pneumatic transports systems, a major limitation to operation in the plug flow regime is the development of recirculation cells otherwise known as downdraft zones. These cells form locally in the channels used in conventional systems (regardless of the shape of the cross sectional area) when separation occurs between the boundary layer and the core of the developed flow. In many instances, for example fluid catalytic cracking of hydrocarbons, the formation of recirculation zones is undesirable because it can lead to increase solids hold up, resulting in over cracking of the hydrocarbon. Wei et al report in a paper entitled 'A Pilot Plant Study and 2-D Dispersion-Reactor Model for a High-Density Riser Reactor' in Chemical Engineering Science v56 pg 613-620 (2001) that for the acrylonitrile process yield increases from approximately 72% to 84% as back mixing is eliminated from the fluidized system.

When properly designed, a fluidized bed application operated microchannel apparatus can have the advantage of avoiding downdraft zones and the ensuing recirculation of particulate suspensions along process channel walls. This advantage relates to the boundary layer thickness relative to the overall channel dimensions.

For most macrochannel applications, the boundary layer is the thin fluid layer adjacent to the surface of a wall or body in the flow where strong viscous effects exist. These viscous effects take place due to the large velocity gradients which take place between the bulk flow in the middle of the channel and the surface of the wall where a no slip condition holds, i.e., at the wall the flow is essentially stagnant. Within this viscous sublayer, the superficial flow velocity may be very low, and the associated hydrodynamic force may be too low to maintain suspended particles against the opposing force of gravity, leading to a recirculation downdraft of the fluidized bed along the channel walls. This downdraft phenomena can adversely impact the overall process and can be altogether avoided in some microchannel applications. To understand how this is true, a careful examination of the boundary layer is required.

A commonly used metric of a boundary layer is the boundary layer thickness, denoted $\delta$, defined as the distance from the solid boundary, in this case the wall of the microchannel at which the local value of the velocity magnitude essentially reaches 0.99 of the free-stream or outer-flow value. Another measure of boundary layer thickness which is related to $\delta$ and is more relevant to the understanding of the downdraft problem is the displacement thickness, $\delta^*$ (see FIG. 1). This thickness is defined as the distance which the undisturbed outer flow is displaced from the boundary (microchannel wall) by a stagnant layer that removes the same mass flow from the flow fields as the actual boundary layer. Alternatively, it can be thought of as a zero-velocity layer which has the same mass-flow defect as the actual boundary layer. The displacement thickness is therefore the region that defines the separation zone between the free-stream flow and the wall or channel boundary where the potential downdraft region exists. If this separation zone could be removed by merging of the displacement thicknesses from each of the opposing microchannel wall the entire flow region would then be encompassed by the displacement thickness and the downdraft phenomena can be eliminated above the point at which the displacement thicknesses meet. The phenomenon can be understood by considering that the stream lines of the fluid flowing into the microchannel initially have approximately the same magnitude (the bulk flow value) and are parallel to one another, this magnitude is greater that that of the streamlines in the displacement thickness. When the incoming streamlines contact the flow in displacement thickness they can be deflected and this shedding can set up the down draft cell as indicated in FIG. 1. Past the point in the channel at which the displacement thicknesses from each wall meet (the run up length) all the streamlines are again parallel and down draft cells cannot develop.

The mathematical expressions for δ and δ* are as follows:

$$\delta = \frac{5.48x}{\sqrt{R_N}} \text{ and } \delta^* = \frac{1.72x}{\sqrt{R_N}}$$

where x=Distance from inlet (leading edge) of microchannel (see FIG. 1)

$R_N = Ux/v$

U=superficial velocity of the fluid in the microchannel v=dynamic viscosity of the fluid Thus, both boundary layer metrics initially grow in thickness as $\sqrt{x}$ and the displacement thickness is approximately ⅓ of the boundary layer thickness for the same axial location, x, measured from the inlet of the channel.

Typically, macrochannel dimensions are sufficiently large that the boundary layer does not completely occupy the entire channel cross-section. However, microchannel dimensions are sufficiently small that the boundary layer displacement thickness can exceed ½ the minimum distance between the microchannel walls (H), thereby resulting in complete removal of the associated stagnation/separation zone between the free-stream and boundary layer. This minimum distance (H), or critical dimension is also referred to as the channel 'Gap'.

As design criterion for microchannel fluidized bed configurations the above can be used to determine the distance at which the displacement thickness completely occupies the channel and thus any subsequent axial distance downstream will not exhibit downdraft. Taking the equation given above for δ* and solving for $x=x_H$ this is to say solving for the distance from the inlet of the microchannel at which the displacement distances δ* from each opposing channel wall meet (i.e. δ*=H/2) and thus finding the point beyond which the downdraft zones are no longer significant, we obtain:

$$x_H = 0.338 \left(\frac{H}{2}\right)^2 \left(\frac{U}{v}\right)$$

In the above equation variable XH is also known as the run up length. The run up length is the distance from the inlet where the displacement thicknesses meet. The above equation is applicable to rectangular openings can also be used for other geometries to estimate the run up length for circular cross sections, in the case of circular cross-sections the dimension for the gap (H) is replaced with the value of the circular cross sectional channel diameter. In some preferred embodiments velocity is controlled such that the run up length is less than 5% of the total channel microchannel length, in another embodiment the velocity is controlled such that the run up length is less than 20% of the total microchannel length in another embodiment less than 50% and in another less than 100%. In various embodiments, conditions can be controlled, for example: per microchannel gas flow less than 100 liters per min (actual volumetric flow rate based on inlet conditions of pressure and temperature a molar flow not the volumetric flow rate based on standard conditions of temperature and pressure) and gap in the range of 0.25 mm to 10 mm with aspect ratio in the range 1:1 to 50:1; per microchannel gas flow less than 50 liter per min and gap in the range of 0.25 mm to 10 mm with aspect ratio in the range 1:1 to 50:1; per microchannel gas flow less than 10 liter per min and gap in the range of 0.25 mm to 10 mm with aspect ratio in the range 1:1 to 50:1; per microchannel gas flow less than 1 liter per min and gap in the range of 0.25 mm to 10 mm with aspect ratio in the range 1:1 to 50:1; or a gas flow in the range of 0.25 liter per minute and a gap in the range of 2 mm to 10 mm with an aspect ratio in the range of 4:1 to 10:1.

Selective Elutriation

In some embodiments of this invention microchannel architecture is used to produce selective separation (elutriation) of specific sizes shapes or densities of particles from a mixture of particles by varying the velocity of the fluidizing medium. In one embodiment it would be desirable to remove light or small particles and to retain solids of greater than or equal to a certain density or size, in another it would be desirable to remove light or small particles less than or equal to a certain density or size such that they could be collected in a subsequent processing step. Particle shape may also be used as the determinate of separation. In yet another embodiment particle capture can be enhanced by placing a jet or staging point in the channel by which more fluidizing medium can be injected into the channel such that the velocity can be increased ensuring any particles that reach the staging point are carried away (to be rejected, recycled or collected as desired).

Figure 2:
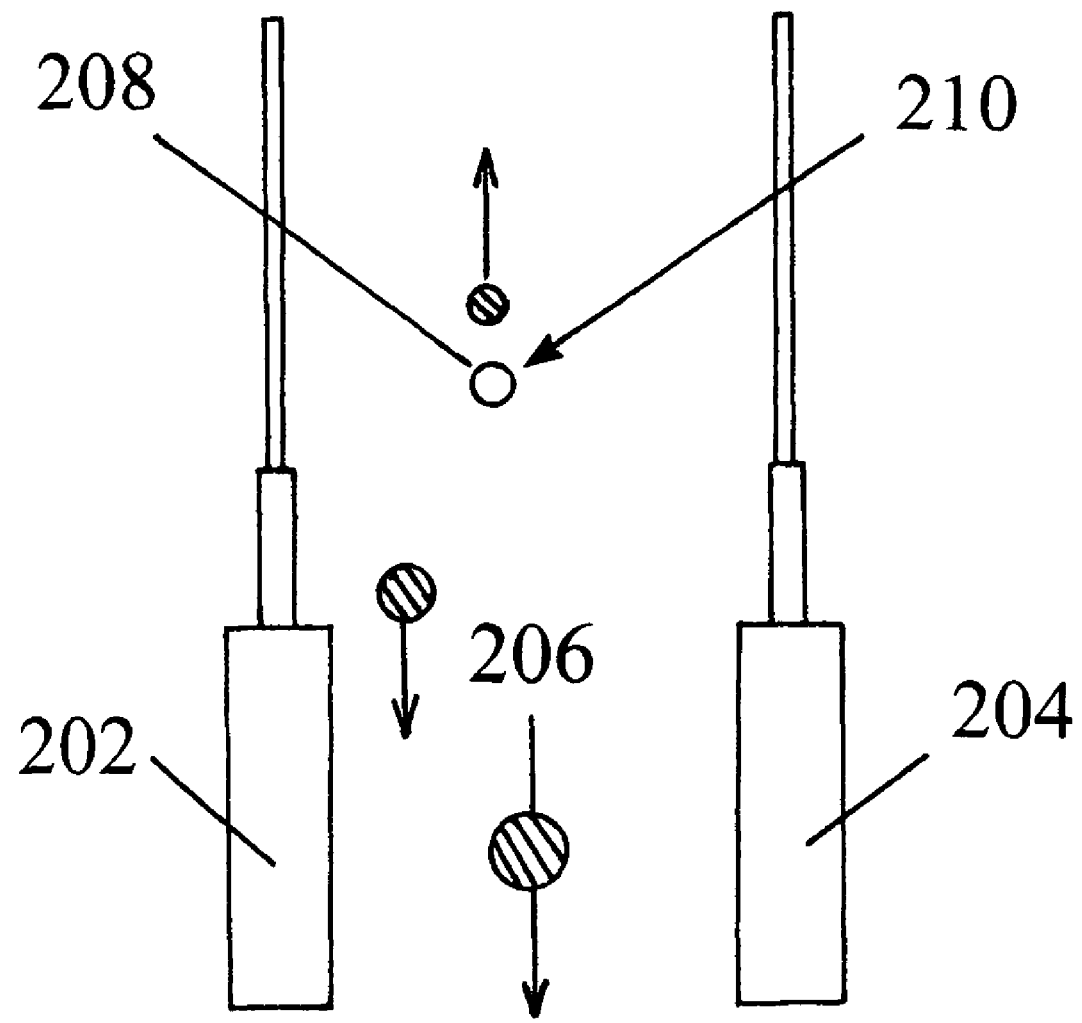
FIG. 2 illustrates a system in which a jet of fluid is injected through an orifice in a microchannel wall to assist in particle elutriation.

One embodiment is illustrated in FIG. 2. In this embodiment, the walls 202, 204 are configured so that the cross-sectional area of the microchannel increases with distance up the channel. This increase in area reduces velocity and reduces fluid viscosity so that particles 206 will fall more easily. Channel walls above and below the plane of the page (not shown) constrain flow. An orifice 208 in at least one of the microchannel walls allows in-flow 210 from a high pressure gas source. In some preferred embodiments, the high pressure gas is a gas flow injected from an adjacent microchannel. The injected flow sweeps up the higher (or otherwise more readily fluidized) particulates and carries them out of the microchannel.

Manifolding to Distribute Flow in Particulate-Containing Microchannels

Flow from a header into a microchannel array and/or from a microchannel array into a footer can be controlled through the use of manifolding structures. One embodiment for manifolding within microchannel devices including structures and methods of controlling flow are described in detail in U.S. Pat. No. 7,422,910 filed Oct. 27, 2003, which is incorporated herein as if reproduced in full below. This invention includes any of the structures or methods described in the incorporated reference with the additional requirement of a particulate-containing stream as described herein.

Figure 6:
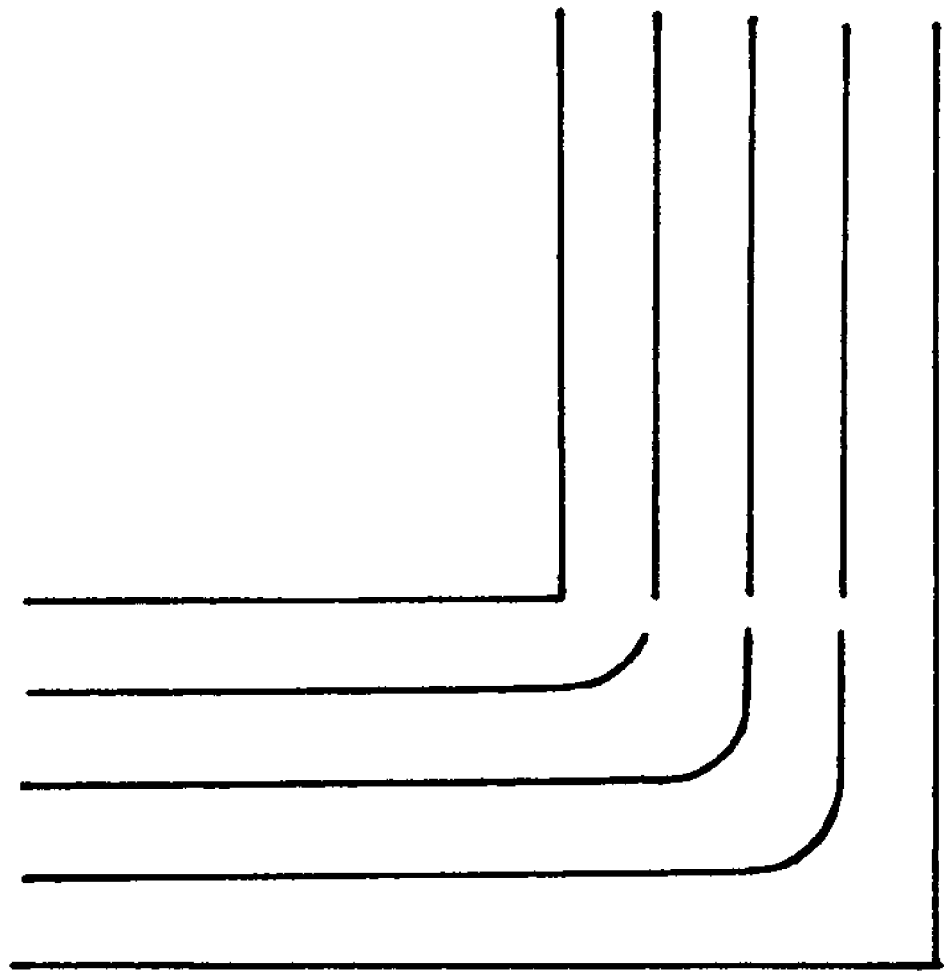
FIG. 6 illustrates a race track structure in a header for equal distribution of flow in an array of microchannels.
Figure 7:
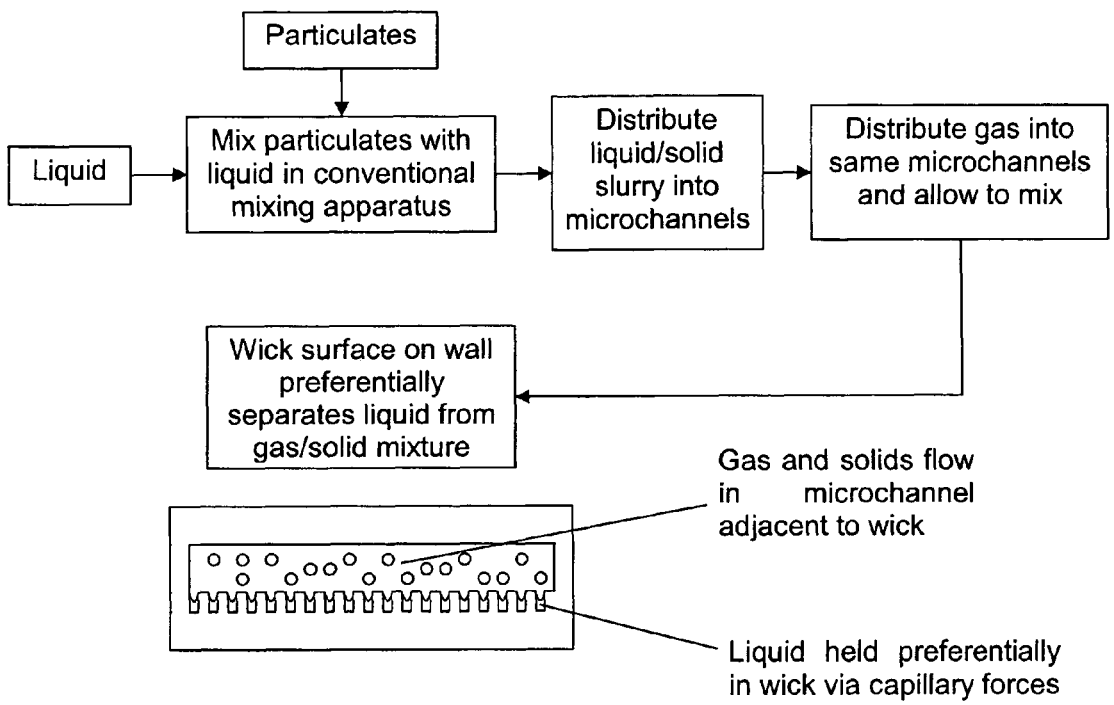
FIG. 7 shows a flow diagram of a wick-assisted process of entraining solid particles and illustrates the cross-section of a microchannel device comprising a wick with liquid in a wick and solid particulates entrained in a gas.

In the present invention, features (such as described in the incorporated application) that distribute flow from a manifold to plural microchannels are called "flow modifying manifold connections" because these features modify flow as compared to a simple header in which flow is passed through a manifold to the microchannels in an unobstructed, unmodified fashion. In a typical case, flow enters a manifold and, without obstruction, turns into an array of microchannels; a problem is that momentum carries a disproportionately large part of the flow into the microchannels that are farthest from the manifold inlet. One type of flow modifying manifold connection is race tracks (see FIG. 6) that are walls disposed in a header that segregate flow in the header at a point sufficiently upstream of a turn to reduce flow maldistribution caused by momentum effects. Another type of flow modifying manifold connection is projections into the microchannels that obstruct flow to control flow in a desired manner.

In some preferred embodiments, at least two, more preferably at least 5, in some embodiments at least 10 or at least 100 or, in some embodiments, 5 to 500 connecting channels are served by a single manifold. In many preferred embodiments, flow is controlled to be distributed equally over multiple connecting channels with Q factors (as described in the Glossary, and in alternate embodiments include $Q_1$ or $Q_2$) of 30% or less, more preferably 20% or less, and in some embodiments, in the range of 0.1% to 15%.

Figure 3:
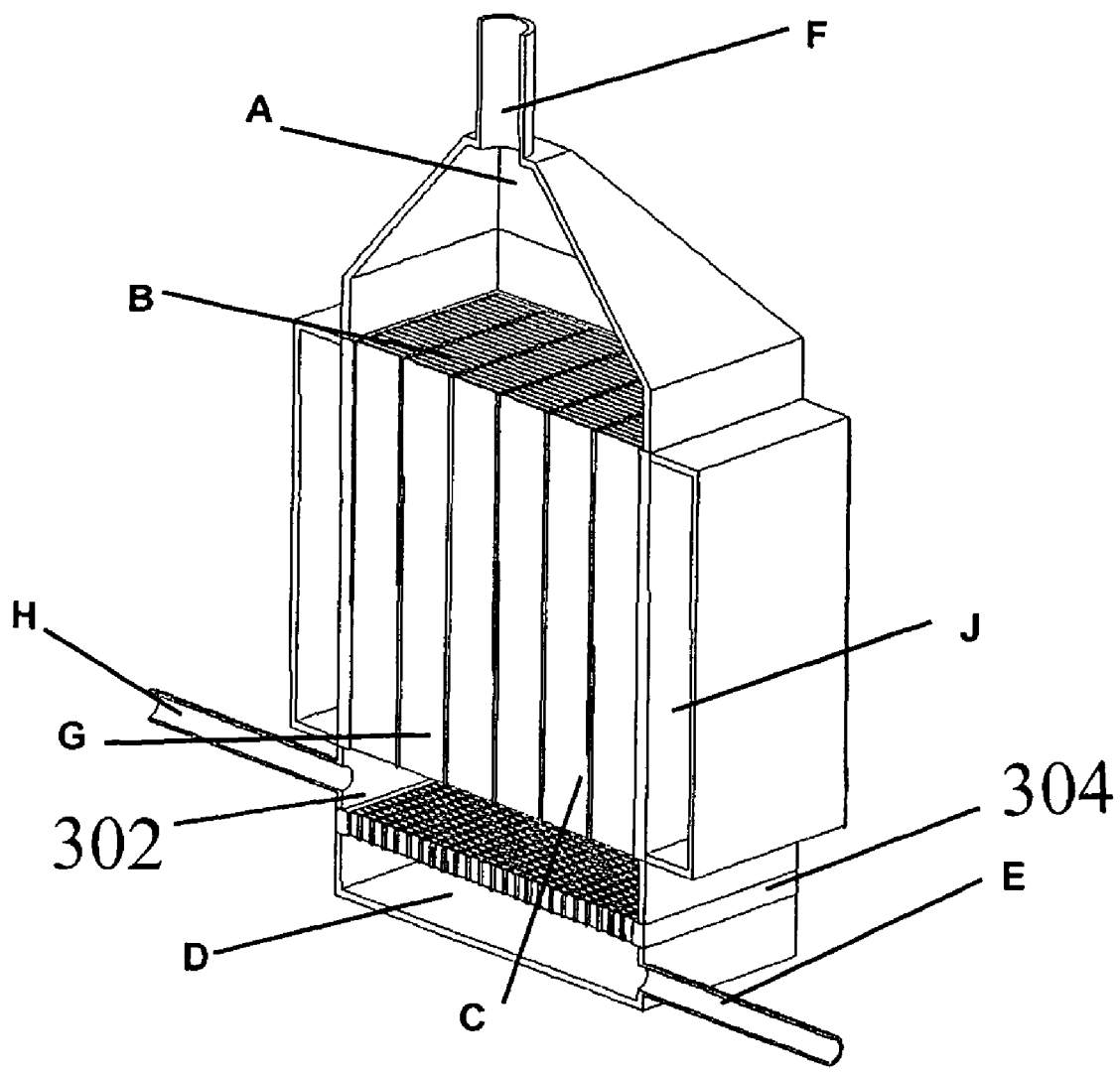
FIG. 3 is a cross-sectional view of a device for entraining particulates and distributing the entrained particulates in an array of microchannels.

In one embodiment, (see FIG. 3) the microchannel portion of a device can be placed directly on a wind box D and entrainment section (302). The wind box is an open volume into which a fluidizing medium is brought prior to distribution into an entrainment section or process microchannel. It may either be empty or contain features (such as race tracks, see FIG. 6) to aid in fluid distribution. A distribution plate 304, optionally, can be placed between the wind box and the entrainment zone. In a preferred embodiment, the distribution plate has microchannels for fluid flow to create jets to assist particulate entrainment. In a preferred embodiment, the distribution plate is a flow modifying manifold connection that tends to equalize flow over the length of the entrainment zone. "Tends to equalize" does not mean that flow will be perfectly equally distributed to the microchannels, but that flow is more equalized than if there were no design features tending to equalize flow. Alternatively, or in addition, a flow modifying manifold connection can be placed in the entrainment zone and/or at the border between the entrainment zone and the process microchannels C.

The entrainment section 302 is a zone in which particles are contacted with the fluidizing medium. In some preferred embodiments the zone will be maintained with a solids fraction of less than 0.05 in some embodiments with a solids fraction of less that 0.25 and in some embodiments with a solid fractions of less than 0.7. In some embodiments, solids fraction is at least 0.01 and in some embodiments at least 0.05. A stream of fluidizing medium (E) can be brought into the wind box (D) and distributed in to the entrainment section (C). The parts can be modular components that are attached to each other, or the parts can be regions in an integrated design. In the illustrated design, the footer is on top. The distribution may be accomplished using a conventional or microchannel based distribution plate. The microchannel distribution plate can be a plurality of parallel microchannels or a set of microchannels tending to produce a distribution of fluidizing medium uniformly across the distribution surface and in other embodiments to produce a non-uniform distribution. In a preferred embodiment, the interface between wind box (D) and the entrainment section (C) includes a structure that tends to equalize flow in the microchannels (see e.g., the incorporated patent application).

When assembled as a unit, the wind box D is preferably disposed at the 'bottom' with respect to gravity. Particles can be returned to the entrainment section via conduit (H) and entrained in the fluidizing medium and subsequently carried into the microchannels (G). The particulate-containing fluid stream exits the microchannels enters the header (A). The header may be designed such that the velocity of the combined streams carries the particles out of the header to a subsequent separation step. This may be done by reduction of the header cross section or a sweeping stream can be used to assist the removal of the particles. In some preferred embodiments the entrainment section is maintained with a solids fraction of less than 0.02, in some embodiments less than 0.05, and in some embodiments 0.05 to 0.70

The microchannel distribution plate creates a flow pattern in the entrainment zone that is conducive to suspending and carrying particles into the process microchannels.

In some embodiments, the channels in the microchannel distribution plate create fluid bubbles of a desired size. In a preferred embodiment, particles are returned from the footer to the entrainment vessel via an external loop, their movement being assisted by a flow of fluidizing medium. Once in the entrainment section the particles are suspended by the fluidizing medium exiting the microchannel distribution plate and carried into the process microchannels.

Once in the process microchannels, a solid suspension can be temperature controlled by external heat exchanger J or can be rapidly brought to temperature target reaction temperature by heat exchange fluid flowing in interleaved heat transfer channels (not shown). In a preferred embodiment of catalyzed reactions, a desired reaction takes place and the solids suspension of catalyst particles exits the process microchannels. If desired, a multiple temperature zone approach can be used to provide a thermal quench to stop the reaction or to conduct additional reactions at different temperatures prior to the suspension leaving the process microchannels. Alternatively, a temperature gradient might be maintained along the flow length of the microchannels within a given temperature zone. Integrated heat addition or removal is enabled by this invention, allowing fluidized reactions to benefit from the tight temperature control possible in microchannels with its associated benefits of control over selectivity and conversion. Additional reactants can also be added at any point in the microchannels, perhaps between temperature zones. Products and/or solids can also be separated within the microchannels at any point downstream of other unit operations within the same microchannel hardware. Finally, the solids suspension enters the footer. Once in the footer, the solids suspension can be carried by the fluidizing medium to a gas solids separator. If necessary, a supplemental sweep stream, preferably taken as a slip stream of product from the solid/gas separator (not shown), can be used to ensure particles remain entrained.

Jet-assisted Methods for Microchannel Fluidized Beds

Figure 4A:
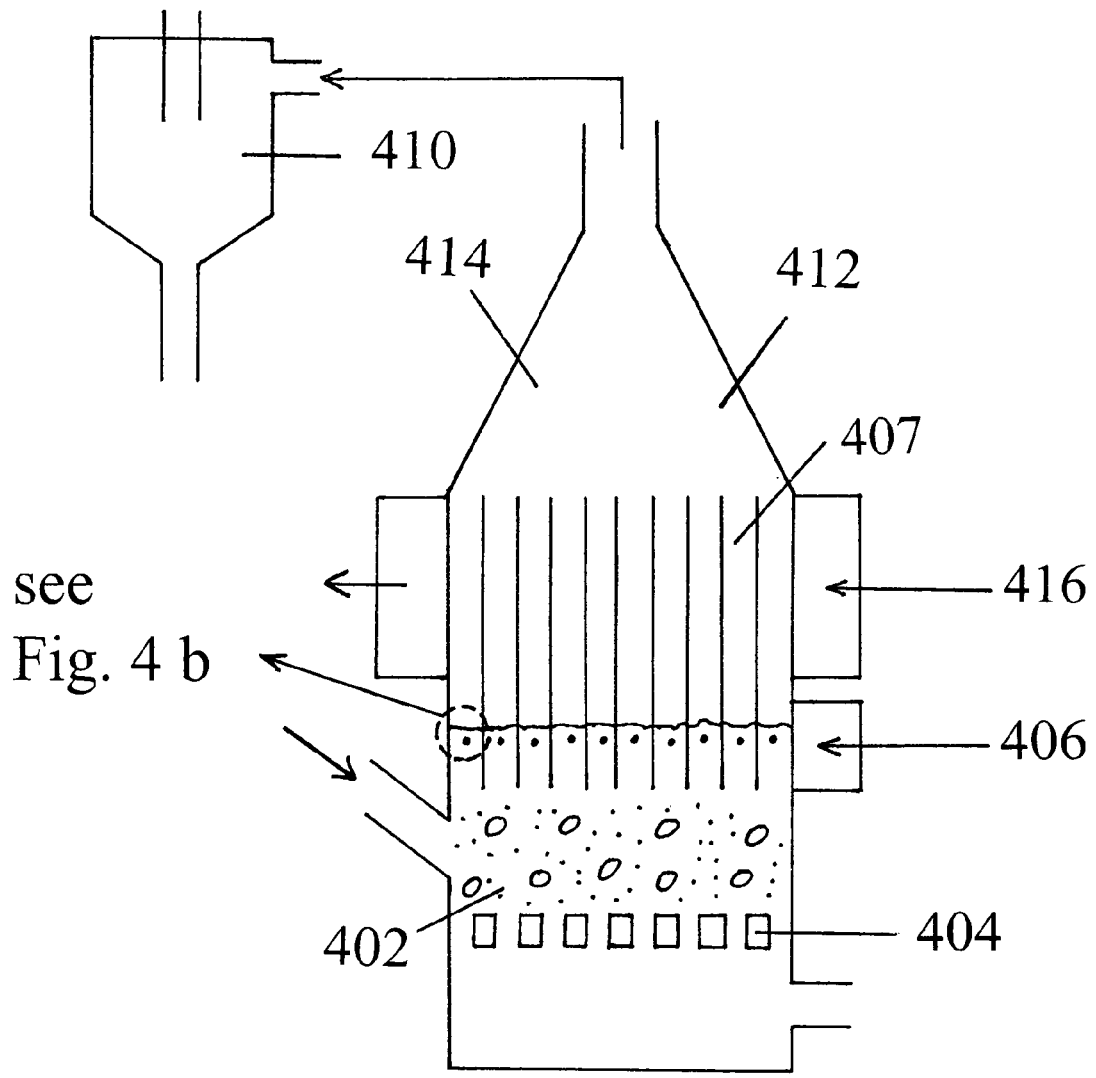
FIG. 4a illustrates a device for a jet-assisted process in a fluidized bed.
Figure 4B:
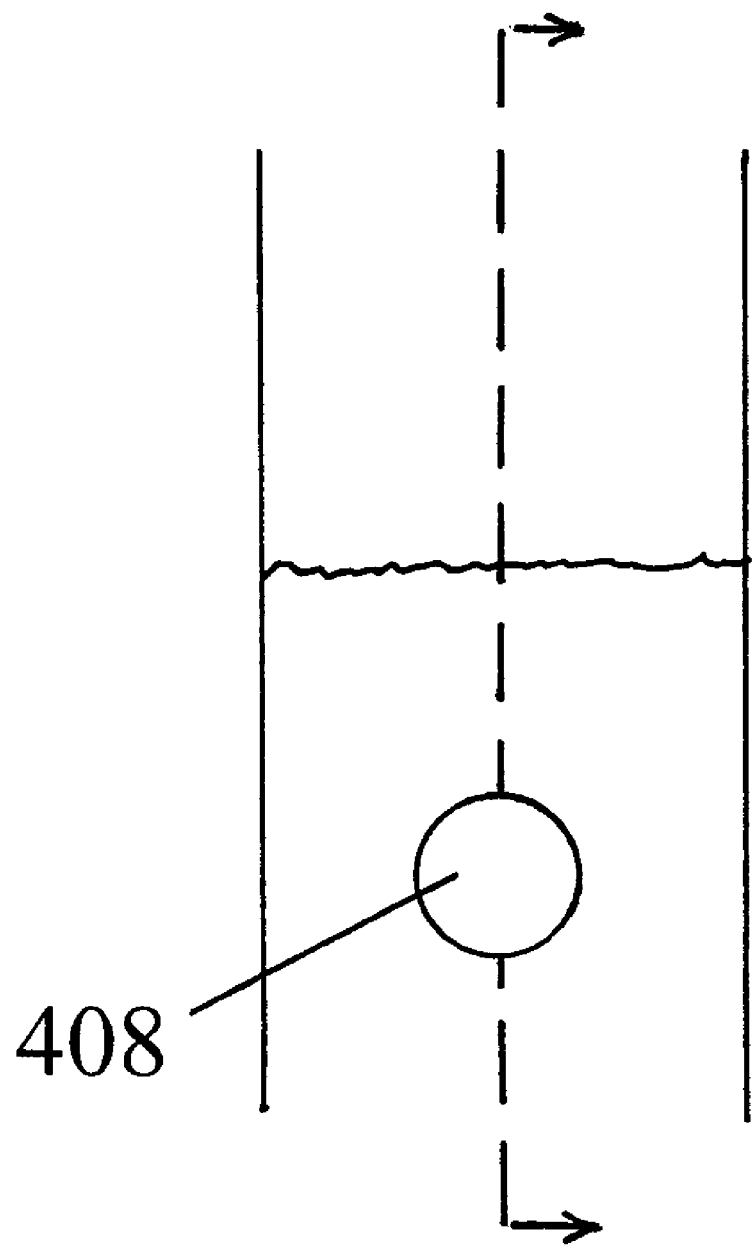

Another mode for operating a circulating bed in a microchannel device would be to maintain the entrainment vessel in one of the following states: Particulate, Bubbling, Slugging or Turbulently fluidized. For a general description of these states see Grace, J. R., "Contacting Modes and Behaviour Classification of Gas-Solid and other Two-Phase Suspensions", *Can. J. Chem. Eng.*, v 64, pp353-363, 1986. Some preferred embodiments use a bed expanded to the turbulent state. In some preferred embodiments, the bed can be expanded in the fluidized state until portions of it extend it the microchannels. The expanded bed 402 can be formed by fluid jets formed through a distributor plate 404 (FIG. 4*a*). More fluidizing medium 406 would then be introduced into the process microchannels at the jet (orifice) location from an interleaved channel (not shown) adjacent to the process channel(s). A jet is an opening in any channel wall that allows a fluid (which may contain suspended solids and/or a fluid mixture) to leave one channel and enter another. This would have the effect of increasing the fluid velocity in the process microchannels. The lighter particulates would be carried away from the expanded bed into the upper reaches of the process microchannels 407 (and optionally to a solids separator 410). The jet may have any cross sectional aspect that can be described by simple geometrical form for example a rectangle, a circle or a triangle or may be irregular for example like an ink blot. The ratio of the cross sectional area of the channel to the cross sectional area of the orifice or jet in some embodiments will be less that 250, and in some embodiments less than 100:1, and in some preferred embodiments less than 70:1 and greater than 1:1. These size ratios for the orifices can apply to any of the various aspects of this invention. In some embodiments the fluid entering the process microchannel via the jet may be a second or third species required to conduct a desired chemical reaction or process, thus reaction in the entrainment section can be avoided. In some embodiments additional jets can introduce a second or third species required to conduct a desired chemical reaction or process above the run up length for the channel thereby further reducing the effects of back mixing. After passing through the process microchannels the suspension enters the header 412. If desired, temperature in the process microchannels can be controlled by a heat exchange fluid 416 flowing in a channel or channels (not shown) adjacent the process channels. Gas velocity in the header can be increased by reducing the cross section (see 414) for flow thus aiding in the maintenance of the suspension. The suspension then leaves the device and the solids are separated from the fluid stream in device such as a cyclone. Particulate matter can then return to the entrainment zone either by hydrostatic forces (gravitationally induced flow), a sweep of fluidizing medium, via application of vibrations or some combination of methods. In some preferred embodiment solids fraction in the microchannel would be less than 0.05, in some embodiments less than 0.10 and in some embodiments 0.005 to 0.25 volume %. Alternatively, if the cross section of the microchannel flow area is smaller than the bubbling bed area upstream of the microchannels, a similar effect can be achieved.

Circulating Microchannel Fluidized Bed with Internal Recycle

Figure 5A:
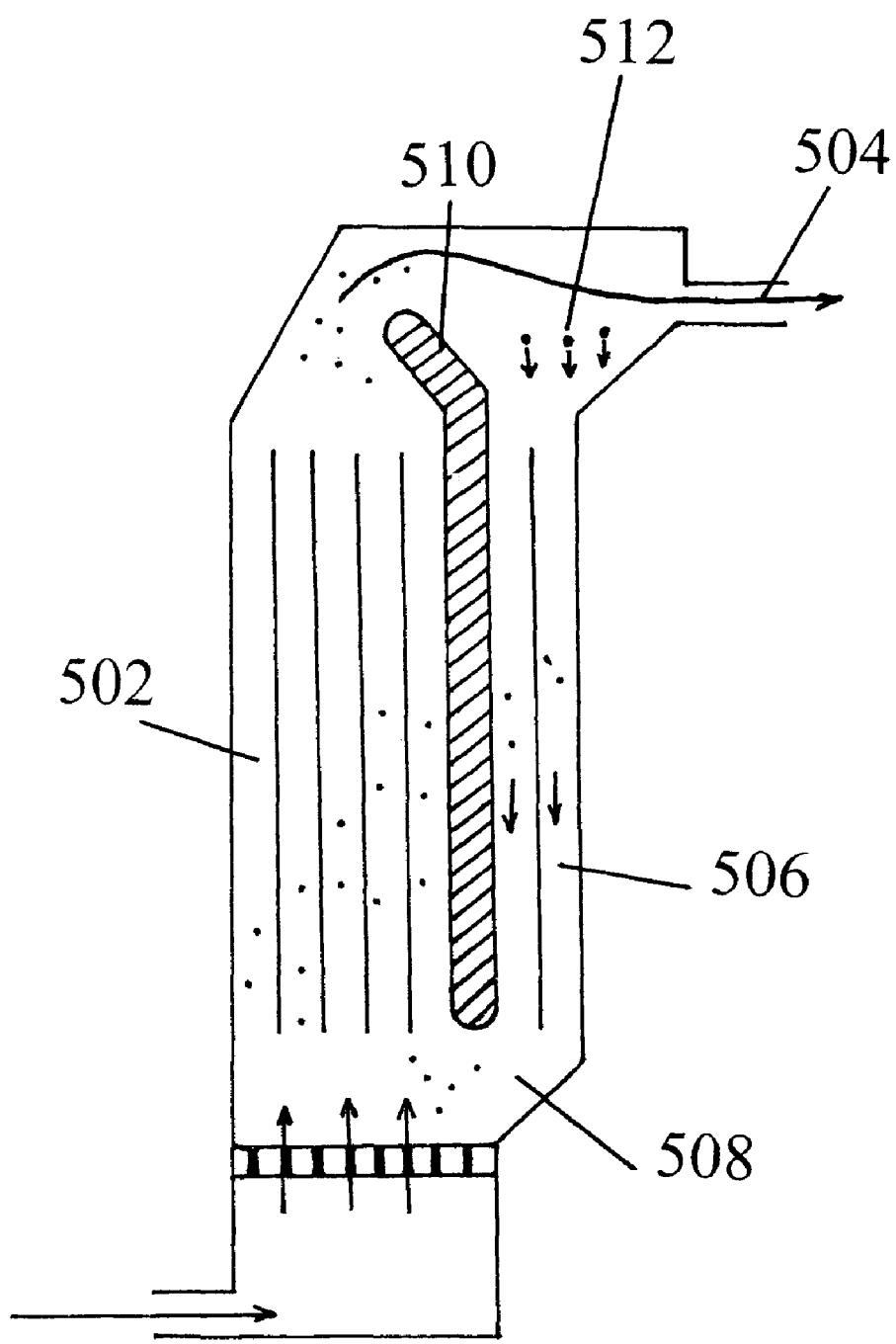
FIG. 5a illustrates a cross-sectional view of an apparatus in which particles are recycled.
Figure 5B:
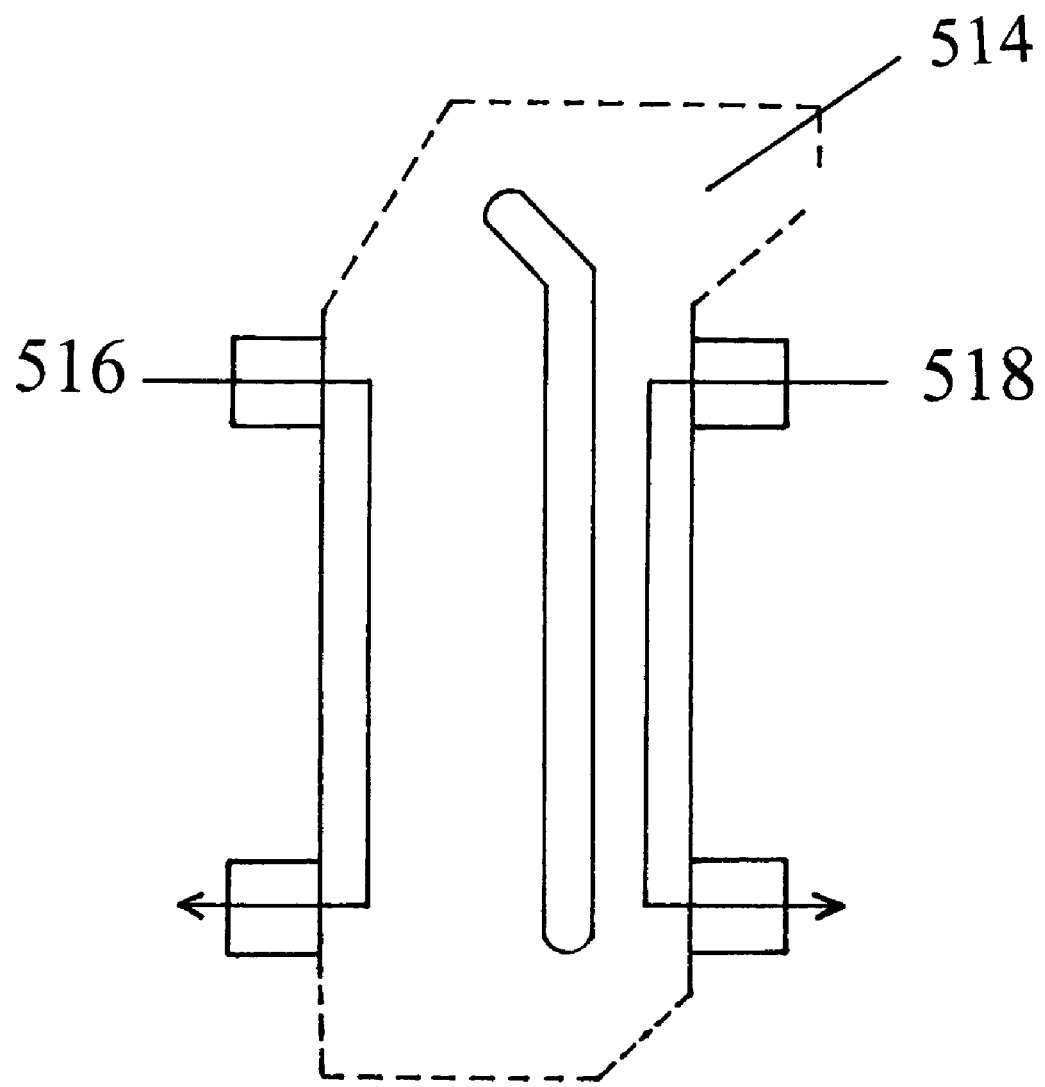
FIG. 5b illustrates an optional, adjacent heat exchange layer.

An example of a circulating bed is illustrated in FIG. 5. In this case, particles are transported into process microchannels 502 but instead of allowing the suspension to flow out of the device for gas/solids separation, the header is devised such that the fluid velocity is reduced thus allowing the solids particles to disengage and return via microchannels 506 to the entrainment zone 508. Some product containing fluid may return to the entrainment zone via this path. Disengagement may or may not be complete and some portion of the solids may leave with the product containing process fluid. Process fluid, typically containing product gas, exits through fluid outlet 504. A dividing wall 510 in the plane of the microchannels separates the process microchannels from the return microchannels. Optionally, a second fluid can be added through orifices 512 on the return side and/or in the footer section; this second fluid could be a quench fluid, a sweep fluid, or additional reactant (and could perform more than two or all of these functions). The second fluid could be added from an adjacent channel (not shown). Optionally, there can be an adjacent channel 514 for heat transfer; in some embodiments, there can be a first circuit 516 for temperature control of the process side and a second circuit 518 for temperature control on the return side. This mode of operation allows rapid quenching of the reaction by removing the catalyst from the reactant mixture rapidly.

Synthesis of Fine Powders in Microchannel Systems

The formation or synthesis of fine powders, including nanoparticles to particles that are up to about 40% the hydraulic diameter of the microchannel, is enabled by formation in microchannels. Synthesis methods include combustion synthesis, nucleation and growth, and crystallization.

Control of the particle size and distribution of particle sizes is enabled through control of local reaction conditions, including temperature, pressure, and low axial dispersion or back-mixing. Flow in microchannels can create high surface shear with the microchannel walls thus enabling the synthesis of smaller particles. The residence time within the microchannel is preferably short (<500 ms, and more preferably less than 100 ms). For a liquid carrier, the preferred contact times may be up to 1000 times longer, including up to 500 seconds or less. Rapid thermal quench at a rate of less than 10° C. per second, or more preferred less than 100° C. per second will aid in the formation of small, equally-sized fine particulates. Fast quench may also inhibit the agglomerization of particles with each other.

Examples of nanoparticles include titania, silica, alumina, iron, and carbon among others including alloys. The small particles may be used as a catalyst support (homogeneous or heterogeneous), an adsorbent, or other small particle application.

The use of a high shear environment can control the morphology of the particles. Particles may be made more perfectly spherical or elongated based on the flow characteristics and corresponding shear force environment in the microchannel synthesis reactor. The high shear environment may prevent particles to continue to grow in a direction normal to the direction of flow. As an example, for the case of emulsion formation, the high surface shear with the wall sweeps the emulsion droplets off an aperatured surface and prevents their continued growth in the continuous phase to larger diameters (see U.S. patent application Ser. No. 10/440,056, filed May 16, 2003, incorporated herein by reference). The high shear force environment may also inhibit agglomeration of particles to form larger and less desired particles.

Wicks

Because of the typically large density differences between solids and gases, the uniform distribution of mixtures of particles and gases into parallel microchannel paths can be problematic. Typically less problematic is the uniform distribution of slurries made up of particles entrained in liquids into parallel microchannel paths. Using this principle, several novel options for distribution of solid/gas mixtures into microchannels are included in the present invention. In one embodiment, a slurry is first made in any standard mixing apparatus by mixing a liquid with solid particulates. The slurry is then introduced into the microchannel device and distributed among the several microchannel paths. Once inside the individual microchannels, a gas is introduced into and distributed (for example, through an orifice in a microchannel wall) among the same microchannels and allowed to mix with the liquid/solid slurry. Finally, the liquid is removed from the mixture by passing the mixture over a wicking material and separating the liquid (and the wick structure) from the gas/solid mixture as the gas/solid mixture flows downstream. Suitable wicking structures for use in microchannels have been well-described in the literature; see, for example, TeGrotenhuis et al., U.S. Pat. No. 6,666,909 and U.S. patent application Ser. Nos. 011,386 filed Dec. 5, 2001 (Published Patent Application 20020144600) and 384,179 filed Mar. 7, 2003 (Published Patent Application 20030221554) which are all incorporated herein. The openings in the wick material should be designed such that the particles cannot pass into the wicking channels but are left in the gas stream.

Another novel option to accomplish a uniform distribution of particle/gas mixtures into parallel microchannel paths is to size the particles and the wick features such that the liquid/particle slurry can flow in the wick (wherein the wick is an array of microgrooves, and the particles are no more than one-fourth the diameter of the microgrooves, preferably no more than one tenth). The liquid/solid slurry is then distributed evenly into the microchannels or into wick material on the wall or walls of each microchannel via wick based pathways. Once the liquid/solid slurry has been distributed into the wick material in the microchannels, the liquid is evaporated into the microchannel either by raising the temperature or lowering the pressure (or both) and the slurry becomes a vapor/particulate mixture. In some preferred embodiments, a gas is introduced into the microchannel containing the wick material before the liquid is evaporated and the particulates are entrained in this gas flow as the liquid evaporates.

Particulates can be removed from a microchannel in a related fashion. A liquid filled wick is formed on the wall or walls of a microchannel containing a flowing gas/particle mixture. Because of the small hydraulic diameter of the microchannel, particles can quickly be captured from the gas phase and into the liquid phase which fills the wick without the use of electrostatic charging. The liquid/solid slurry can then be collected from each microchannel into a common footer or system of footers. The use of such a system can help improve uniformity of particle and gas distribution from channel to channel because the solids are removed from the gas phase before collecting the gas stream in the footer.

Aggregation of Fine Particles

A high shear environment can affect the size and structure of flocculations of suspended small particles. This is an important technology, for example, for pulp and paper, mining, and waste water treatment. In some embodiments, lower levels of flocculating agents are required to maintain a stable suspension in an increasing shear force environment. This is especially true for higher molecular weight materials, including polymers.

Catalyzed Reactions

The following discussions of methanol synthesis and Fischer-Tropsch synthesis are contemplated examples. Neither these processes nor any of the above-described processes have been conducted; however, it is believed that all of the processes described will operate effectively.

Adiabatic Circulating Microchannel Fluidized Bed for Methanol Production

The most commonly employed reactor for the commercial production of methanol is the Adiabatic Quench Reactor. These reactors generally operate with a catalyst bed temperature in the range 225-275° C. and produce a reactor effluent with a methanol content of 4 mole percent. Reactor pressures are in the range of 50-80 atm. In order to achieve a high overall process conversion of carbon monoxide (CO), a recycle ratio of 6:1 is typically used. Productivity is in the range of 1300 $kg_{CH3OH}/kg_{cat}$-d. The reaction is net exothermic and strongly equilibrium limited. Compression represents a major portion of the operating cost of a methanol synthesis train.

Utilizing methods of the present invention, the production of methanol can be conducted isothermally in a microchannel reactor. For example, a reactant gas composition can be used that consists essentially of $H_2$, CO and $CO_2$. A preferred composition may contain 50 to 80 (more preferably 60-70) mole percent hydrogen, 15-30 (more preferably 20-30) mole percent CO and 10 mole percent $CO_2$. The reactant gas carries catalyst particulates into a microchannel or a set of parallel microchannels. The contact time of the gas stream is preferably less than 500 ms, more preferably less than 100 ms, and in some embodiments in the range of 0.1 to 50 ms. In some embodiments the catalyst particulate will be distributed with particle diameters of less than 250 micron but preferably greater than 1 micron, or preferably distributed with particle diameters of less than 120 micron but greater than 20 micron or more preferably distributed with particle diameters of less than 90 micron but greater than 40 micron (the foregoing ranges refer to 95% of the particles; 5% can be outside the stated ranges). In a preferred embodiment the particles will have a Gaussian distribution, in another embodiment a log normal distribution, and in another embodiment a Weibul distribution. In a preferred embodiment, the catalyst is of the Cu/Zn oxide type. In some embodiments, the total solids flux through a microchannel(s) is at least 300 $kg/m^2 \cdot s$, in some embodiments at least 20 $kg/m^2 s$, in some embodiments at least 0.5 $kg/m^2 \cdot s$, and in some embodiments 0.5 to 5 $kg/m^2 s$. The microchannels can be designed with any desired set of dimensions; for example, a height of 0.05 to 10 mm (more preferably 1 to 3 mm), a width of 5 to 1000 mm (more preferably 12 to 100 mm), and a length of 2 to 500 cm (more preferably 15 to 120 cm). In some preferred embodiments, the temperature of the process is in the range of 25 to 1000° C., more preferably 250 to 750° C. Reaction temperatures can be controlled to a constant temperature or variable temperature by heat exchange, or, alternatively operated adiabatically (by eliminating the heat exchange). In microchannel apparatus, heat can be carefully controlled by heat exchange channels that are adjacent to the reaction microchannels; for example, as is known in the prior art, a set of at least 3 layers of reaction microchannel layers can be interleaved with a set of at least 3 layers of heat exchanger (preferably microchannel heat exchanger) layers. In preferred embodiments, the flow of reactant is oriented such that both the gas and catalyst particles flow down with respect to gravity.

Elimination of the fixed bed reduces the total pressure drop of the cycle and thus the capital and operating costs of the synthesis train are reduced. The pressure drop from microchannel reactor to particle separator to condenser to recycle is preferably less than 7 psig. It is believed that in the inventive method, the gas leaving the microchannels has a methanol content that is 90% of the value predicted at equilibrium.

Fischer-Tröpsch Reaction to Produce Paraffins from Mixtures of CO and Hydrogen

Paraffins can be produced from mixtures of CO and hydrogen via the Fischer-Tröpsch reaction when passed over cobalt or iron based catalysts. Selectivity to the desired product slate is dictated by the temperature of the reaction environment as well as by diffusional constraints inside the catalyst particle. Operational temperatures of commercial systems are generally in the range of 210° C. to 250° C. Early commercial Fischer-Tröpsch synthesis systems were operated as tube cooled fixed-bed reactor containing cobalt catalysts. Current commercial production is based on the three-phase SASOL slurry bed technology in which 50 micron iron catalyst is suspended in the paraffinic product and synthesis gas is percolated through the mixture at pressure (~275 psig). The contact time is approximately 10 s and the conversion of CO is 87%. Catalyst productivity is 0.2 kg of hydrocarbons/kg of catalyst/hour.

The Fischer-Tropsch reaction can be conducted in a cross-flow microchannel reactor with a cross flow structure; that is, in a reactor in which two streams flow orthogonally to each other in alternating planes. Preferably, the process stream flows upwards against gravity. A coolant stream flows in the other plane. In some embodiments, the working fluid on the cooling side is water and cooling is via boiling heat transfer.

Preferably, the catalyst is a cobalt based catalyst disposed on a suitable fluidizable support such as spray dried kaolin and diatomatious earth. The fluidizable support can be tailored to have a low skeletal density for ease of fluidization and a catalyst porosity structure suitable for the retention of hydrocarbons (to promoted chain growth to the desired degree). The process stream is a mixture of hydrogen and CO in a molar ratio of 1.65:1. At the inlet to the process microchannels the pressure is 35 atm. The coolant side is operated to maintain a uniform temperature of 225° C. Under these conditions the conversion of CO will be at least 70% when the contact time is 25 ms and the solids flux through the open area of the microchannels is 0.12 kg/m2-s. In some embodiments the molar ratio of hydrogen to CO in the feed is greater than 1:1 in another embodiment the molar ratio of hydrogen to CO in the feed is greater than 1.5:1 and in another preferred embodiment the molar ratio of hydrogen to CO in the feed is greater than 2.1 and in some embodiments is in the range of 1.8:1 to 2.2:1. In some preferred embodiments, contact time of the fluid and/or the entrained mixture through the microchannel, microchannel array, or entire device, is less than 1000 ms, in other embodiments is less than 500 ms and in another embodiment less than 300 ms and in some embodiments is in the range of 20 ms to 250 ms. In some preferred embodiments, the median particle size is less than 500 μm, in other embodiments is less than 250 μm and in another embodiment less than 100 μm and in some embodiments is in the range of 20 μm to 200 μm. In some preferred embodiments, the inlet pressure is less than 200 atm, in other embodiments is less than 50 atm and in another embodiment less than 25 atm and in some embodiments is in the range of 20 atm to 50 atm. In some preferred embodiments, the productivity is greater than 1000 kg of hydrocarbon product per kg of catalyst per hour and in another embodiment is greater than 100 kg of hydrocarbon product per kg of catalyst per hour and in another embodiment is greater than 10 kg of hydrocarbon product per kg of catalyst per hour and in some embodiments is in the range of 2 kg of hydrocarbon product per kg of catalyst per hour to 20 kg of hydrocarbon product per kg of catalyst per hour. In some preferred embodiments, the CO selectivity to hydrocarbons with carbon numbers greater than 4 is greater than 50% and in other embodiments the CO selectivity to hydrocarbons with carbon numbers greater than 4 is greater than 75% and in other embodiments the CO selectivity to hydrocarbons with carbon numbers greater than 4 is greater than 95% and in some embodiments is in the range of 88% to 98%. In some preferred embodiments, the CO selectivity to methane is less than 2% and in other embodiments the CO selectivity to methane is less than 4% and in other embodiments the CO selectivity to methane is less than 6% and in some embodiments is in the range of 5% to 10%.

EXAMPLES

Testing involving the flow of solid particulates through a microchannel has been conducted with a microchannel test apparatus. In this testing, particles carried by an air stream were passed though a 0.31 mm diameter hole (the hole was 1.7 mm in length). The orifice opened into a perpendicular microchannel having dimensions of 1.00 mm height×2.4 mm width×2.5 mm length. The orifice was positioned in the center of the microchannel by width and length; thus particulates carried by the flow traversed the 1.00 mm height and impinged against the opposite wall of the microchannel before being carried out along the length of the microchannel. The test devices were constructed of Inconel 625.

Testing was conducted in three identically-configured test devices with a stream of particulates entrained in a steam of compressed air. One portion of the particles were obtained from Arizona Road Test Dust, which is a standardized dust used by automotive companies when automotive tests are needed in a dusty environment. This dust has been sieved into different sizes; the size purchased and used for this experiment was 0 to 10 micron with 99% of the particles being in this range. Laser light scattering was used to determine the volume based particle size distribution a constant density was assumed for the particles and mass weighted average particle diameter of 3.2 micron was calculated. The density of these particles was 2650 kg/m$^3$. The Arizona Road Test Dust was fed into the system through a fluidized-bed dust feeder. This feeder consisted of a plastic tube with an outer diameter of ⅝" and an inner diameter of ⅜" and air was inserted into the bottom of this tube. This tube contained larger zirconia particles of diameter 0.0059" (0.15 mm) and the test dust; the zirconia particles were present to help fluidization and were significantly heavy such that they did not leave the dust feeder (that is, the zirconia did not pass through the microchannel test device). The mass ratio of zirconia to test dust was 2:1 (i.e. 2 grams of zirconia for each gram of test dust). Various testing parameters and erosion results are shown in the Table below (surface temperature refers to the surface temperature of the test device. No plugging or change in pressure drop was observed during the test.

|  |  | Test device # | | |
| --- | --- | --- | --- | --- |
|  |  | 1 | 2 | 3 |
| Outside surface temperature | ° C. | 850 | 850 | 1050 |
| Total amount of dust fed | mg | 49.4 | 45.2 | 60.0 |
| Total duration of test | hours | 12 | 8 | 8 |
| Orifice Particle Mass Flux | kg/m$^2$hr | 84.8 | 77.6 | 103 |
| Flowrate of air | SLPM | 0.360 | 0.360 | 0.360 |

The invention claimed is:
1. A method of conducting a chemical process, comprising:
   flowing a gaseous stream carrying solid particulates through a microchannel;

wherein the gaseous stream flowing through the microchannel has a Reynolds Number of at least 1000;
wherein the microchannel comprising a flowing gas stream comprises a run up length;
controlling operating conditions and microchannel dimensions or velocity of the gaseous stream carrying solid particulates through the microchannel such that the run up length, $x_H$, is less than the microchannel length;
wherein $$x_H = 0.338\left(\frac{H}{2}\right)^2 \left(\frac{U}{v}\right)$$

wherein
H is the smallest dimension (gap) of the microchannel,
U=superficial velocity of the gas in the microchannel
v=dynamic viscosity of the gas in the microchannel; and
conducting a chemical process in the microchannel.

2. The method of claim 1 wherein the microchannel is straight and has a rectangular cross-section.

3. The method of claim 1 where in the microchannel has a circular cross-section.

4. The method of claim 1 where there is a solids flux through the microchannel that is continuously greater than 0.01 kg/m² s for at least 8 hours.

5. The method of claim 1 wherein $x_H$, is less than 10% of the microchannel length.

6. The method of claim 2 wherein $x_H$, is less than 50% of the microchannel length.

7. The method of claim 6 conducted in a plurality of microchannels, and comprising passing flow through the plurality of microchannels at a per microchannel gas flow of less than 100 liters per min and wherein the smallest microchannel dimension is in the range of 0.25 mm to 10 mm with an aspect ratio in the range 1:1 to 50:1.

8. The method of claim 1 comprising passing the gaseous stream through a flow modifying manifold connection and through a microchannel array.

9. A method of conducting a chemical process, comprising:
flowing a fluid stream into a header and through a flow modifying manifold connection to form a distributed flow in a microchannel array;
wherein there is an interface between the header and the microchannel array; and
conducting a chemical process in the microchannel array; and wherein
(a) the distributed flow carries solid particulates through the microchannel array, or
(b) the distributed flow entrains solid particulates;
wherein each of the microchannels in the microchannel array comprise a run up length;
wherein the fluid stream flowing through the microchannel array has a Reynolds Number of at least 1000; and further comprising a step of controlling flowing the gaseous stream into the microchannel array such that the run up length of the microchannels in the microchannel array, $x_H$, is less than the microchannel length;
wherein $$x_H = 0.338\left(\frac{H}{2}\right)^2 \left(\frac{U}{v}\right)$$

wherein H is the smallest dimension (gap) of the microchannel,
U=superficial velocity of the gas in the microchannel
v=dynamic viscosity of the gas in the microchannel.

10. The method of claim 9 wherein the distributed flow entrains particulates and carries the entrained particulates through the microchannel array.

11. The method of claim 9 wherein the flow modifying manifold connection tends to distribute flow equally into the microchannel array.

12. The method of claim 9 wherein the fluid stream is a gaseous stream carrying solid particulates; wherein the microchannels in the microchannel array have the same length and the same gap.

13. A method of conducting a chemical process, comprising:
flowing a first fluid stream carrying solid particulates through a microchannel;
wherein at least a portion of the solid particulates are agglomerated; and
passing a second fluid stream into the microchannel at a rate sufficient to cause a decrease in particle agglomeration;
wherein the first fluid stream flowing through the microchannel has a Reynolds Number of at least 1000; and
wherein the microchannel comprising the first fluid stream comprises a run up length;
controlling operating conditions and microchannel dimensions or velocity of the gaseous stream carrying solid particulates through the microchannel such that the run up length, $x_H$, is less than the microchannel length;
wherein $$x_H = 0.338\left(\frac{H}{2}\right)^2 \left(\frac{U}{v}\right)$$

wherein
H is the smallest dimension (gap) of the microchannel,
U=superficial velocity of the gas in the microchannel
v=dynamic viscosity of the gas in the microchannel.

14. A method of conducting a chemical process, comprising:
providing a first fluid stream carrying solid particulates into a microchannel in a direction opposing gravity;
wherein the microchannel has an inlet, an outlet and a length between the inlet and the outlet;
wherein the microchannel is further defined by at least one microchannel wall;
wherein said at least one microchannel wall comprises at least one orifice;
wherein said at least one orifice is located between the inlet and the outlet;
wherein the first fluid stream flows into the microchannel at a rate such that at least a portion of said particulates are pulled down by gravity and are not carried along the entire length of the microchannel;
providing a second fluid that passes through the orifice, into the microchannel, and out of the outlet; and
conducting a chemical process in the microchannel;
wherein the first fluid stream carrying solid particulates through the microchannel has a Reynolds Number of at least 1000; and
wherein the microchannel comprising the first fluid stream comprises a run up length;
controlling operating conditions and microchannel dimensions or velocity of the gaseous stream carrying solid particulates through the microchannel such that the run up length, $x_H$, is less than the microchannel length; wherein $$x_H = 0.338\left(\frac{H}{2}\right)^2\left(\frac{U}{v}\right)$$

wherein
H is the smallest dimension (gap) of the microchannel,
U=superficial velocity of the gas in the microchannel
v=dynamic viscosity of the gas in the microchannel.

15. The method of claim 14 wherein at least a portion of the solid particulates are agglomerated; and wherein the second fluid passes into the microchannel at a rate sufficient to cause a decrease in particle agglomeration.

16. A method of conducting a catalyzed chemical reaction in a microchannel reactor, comprising:
providing a first fluid stream carrying solid catalyst particulates into a microchannel;
catalyzing a reaction using the solid catalyst particulates in the microchannel;
wherein the solid catalyst particulates move out of the microchannel; and
subsequently, recycling the solid catalyst particulates back into the microchannel in a continuous fashion; wherein the first fluid stream carrying solid catalyst particulates through the microchannel has a Reynolds Number of at least 1000; and
wherein the microchannel comprising the first fluid stream comprises a run up length;
controlling operating conditions and microchannel dimensions or velocity of the gaseous stream carrying solid particulates through the microchannel such that the run up length, $x_H$, is less than the microchannel length; wherein $$x_H = 0.338\left(\frac{H}{2}\right)^2\left(\frac{U}{v}\right)$$

wherein
H is the smallest dimension (gap) of the microchannel,
U=superficial velocity of the gas in the microchannel
v=dynamic viscosity of the gas in the microchannel.

17. The method of claim 6 wherein the solids flux through the microchannel is continuously greater than 0.01 kg/m²s for at least 8 hours.

18. The method of claim 2 wherein flow is controlled such that the run up length is 10% or less of the microchannel length.

19. The method of claim 16 wherein flow is controlled such that the microchannel comprises a run up length and wherein the run up length is 20% or less of the microchannel length.

20. The method of claim 11 wherein the flow is distributed to the microchannel array with a Q factor or less than 30%.

21. The method of claim 14 wherein the microchannel is substantially parallel to gravity.

22. The method of claim 21 wherein the second fluid comprises a quenching agent.

23. The method of claim 21 wherein the first fluid stream comprises a carrier gas, and wherein the solid particulates move at a rate that is significantly slower than the carrier gas.

24. The method of claim 1 wherein the mean particle size of the solid particulates is in the range of 5 μm to 100 μm.

25. The method of claim 1 wherein the mean particle size of the solid particulates is in the range of 5 nm to 100 nm.

26. The method of claim 13 wherein the first fluid stream has a volume fraction solids of at least 0.05.

27. The method of claim 14 wherein the solids flux through the microchannel is at least 0.1 kg/m²s.

28. The method of claim 1 wherein the solids flux through the microchannel is at least 1.0 kg/m²s.

29. The method of claim 16 wherein the solids flux through the microchannel is at least 1.0 kg/m²s.

30. The method of claim 1 wherein a reactant is feed into the microchannel in a distributed fashion along its length.

31. The method of claim 1 wherein the microchannel comprises an inlet, an outlet and walls defining the microchannel;
wherein a second gas enters the microchannel through an orifice in a wall of the microchannel;
wherein the orifice is located between the inlet and the outlet; and
wherein the second gas comprises a reactant, diluent or quenching agent.

32. The method of claim 31 wherein the gaseous steam comprising solid particulates comprises a first reactant and wherein the second gas comprises a second reactant.

33. The method of claim 1 wherein the microchannel comprises an inlet, an outlet and walls defining the microchannel;
wherein a second gas enters the microchannel through an orifice in a wall of the microchannel;
wherein the orifice is located between the inlet and the outlet; and
wherein the second gas comprises a reactant, diluent or quenching agent.

34. The method of claim 33 wherein the gaseous steam carrying solid particulates comprises a first reactant and wherein the second gas comprises a second reactant.

35. The method of claim 1 wherein the chemical process comprises a chemical reaction, mixing, crystallization, emulsion formation, or a separation.

36. The method of claim 1 wherein the chemical process comprises a chemical reaction.

37. The method of claim 9 wherein the chemical process comprises a chemical reaction, mixing, crystallization, emulsion formation, or a separation.

38. The method of claim 9 wherein the chemical process comprises a chemical reaction.

39. The method of claim 14 wherein the chemical process comprises separation of solid particulates.

40. The method of claim 13 wherein the solid particulates in the first fluid stream have a median particle size of 100 to 300.

41. The method of claim 1 wherein the microchannel comprises a microchannel wall and wherein the microchannel wall comprises a coating that inhibits adhesion of particles to the microchannel wall.

42. The method of claim 41 wherein the microchannel wall comprises: a Teflon coating, a polymeric coating, a metallic coating, a metal oxide coating, a hydrophobic coating, a hydrophilic coating, and combinations thereof.

43. The method of claim 16 wherein the solid catalyst particulates comprise a metal oxide and wherein the microchannel comprises a microchannel wall and wherein the microchannel wall comprises a hydrophobic coating.

44. The method of claim 1 wherein flow velocity is controlled such that the run up length is less than 5% of the microchannel length.

45. The method of claim 21 wherein the microchannel comprises a cross sectional area and wherein the cross sectional area increases with distance up the channel.

46. The method of claim 2 wherein the microchannel has at least one dimension of 0.1 to 1 mm.

47. The method of claim 1 wherein the microchannel has at least one dimension of 0.1 to 1 mm.

48. The method of claim 14 wherein the microchannel has at least one dimension of 2 mm or less.

49. The method of claim 13 wherein the microchannel has at least one dimension of 0.1 to 1 mm.

50. The method of claim 16 wherein the microchannel has at least one dimension of 0.1 to 1 mm.

51. The method of claim 11 wherein the flow modifying manifold connection comprises a distribution plate.

52. The method of claim 9 wherein the header comprises a wind box that is disposed, with respect to gravity, below the microchannel array.

53. The method of claim 52 wherein particles from the microchannel array flow into a footer and are then returned to the wind box.

54. The method of claim 1 wherein the fluid stream in the microchannel exchanges heat with a heat exchange fluid in an adjacent microchannel.

55. The method of claim 31 wherein the orifice is located at a point along the length of the microchannel that is greater than the run up length.

56. The method of claim 55 wherein the second gas comprises a reactant.

57. The method of claim 1 wherein the residence of solid particulates in the microchannel is less than 100 ms.

58. The method of claim 16 wherein the first fluid stream comprises hydrogen and carbon monoxide and the reaction comprises the Fischer-Tropsch synthesis.

59. The method of claim 1 wherein the chemical process comprises the Fischer-Tropsch synthesis.

60. The method of claim 58 wherein the solid catalyst particulates comprise cobalt.

61. The method of claim 58 operating continuously for at least 8 hours with substantially undiminished productivity.

62. The method of claim 1 wherein the microchannel has a gap of at least 0.25 mm and a length of at least 1 cm.

63. The method of claim 1 wherein the microchannel is a microchannel in a microchannel array, and further wherein flow is distributed from a manifold into microchannels in the microchannel array with a Q factor of less than 30%.

64. The method of claim 62 wherein the gaseous stream flowing through the microchannel has a Reynolds Number in the range of 500 to 1000.

65. The method of claim 62 wherein the microchannel has a gap in the range of 2 mm to 10 mm.

66. The method of claim 64 wherein flow velocity is controlled such that the run up length is less than 5% of the microchannel length.

67. The method of claim 1 wherein the microchannel is a straight-through microchannel that lacks any curves or serpentine configurations.

* * * * *